(12) United States Patent
Daly et al.

(10) Patent No.: US 11,493,012 B2
(45) Date of Patent: Nov. 8, 2022

(54) START STOP OVERRIDE MODULE

(71) Applicant: Metra Electronics Corp., Holly Hill, FL (US)

(72) Inventors: Charles David Daly, Holly Hill, FL (US); William H. Jones, Jr., Holly Hill, FL (US)

(73) Assignee: Metra Electronics Corporation, Holly Hill, FL (US)

( * ) Notice: Subject to any disclaimer, the term of this patent is extended or adjusted under 35 U.S.C. 154(b) by 0 days.

(21) Appl. No.: 17/064,192

(22) Filed: Oct. 6, 2020

(65) Prior Publication Data

US 2021/0033057 A1 Feb. 4, 2021

Related U.S. Application Data

(62) Division of application No. 16/732,433, filed on Jan. 2, 2020, now Pat. No. 10,844,821.

(60) Provisional application No. 62/787,424, filed on Jan. 2, 2019.

(51) Int. Cl.
*F02N 11/08* (2006.01)
*B60Q 9/00* (2006.01)

(52) U.S. Cl.
CPC ............ *F02N 11/0822* (2013.01); *B60Q 9/00* (2013.01); *F02N 2200/10* (2013.01)

(58) Field of Classification Search
CPC ...... F02N 11/0822; F02N 11/08; H04L 12/40; H04L 2012/40273; H04L 2012/40215; Y02T 10/40
See application file for complete search history.

(56) References Cited

U.S. PATENT DOCUMENTS

2020/0164878 A1\* 5/2020 Orantes ............... F02N 11/0822

\* cited by examiner

*Primary Examiner* — Xiao En Mo
(74) *Attorney, Agent, or Firm* — J. Wiley Horton

(57) ABSTRACT

An override module allowing a vehicle operator to default the status of an automated start-stop system to "off." A first embodiment uses a module that is installed in-line with a manual override button. A second embodiment uses a module that is installed on the vehicle's CAN bus.

20 Claims, 4 Drawing Sheets

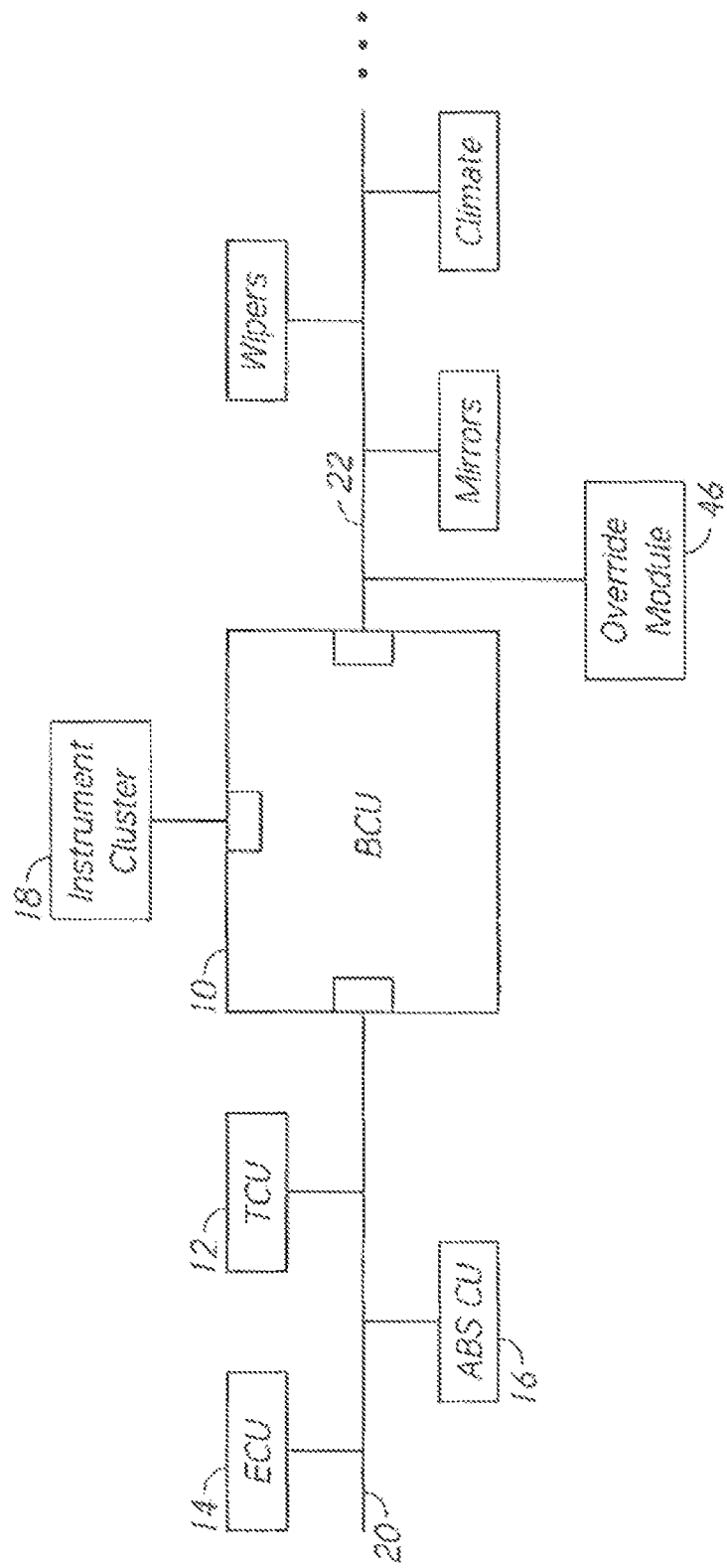

START STOP OVERRIDE MODULE

CROSS-REFERENCES TO RELATED APPLICATIONS

This non-provisional patent application is a continuation of U.S. patent application Ser. No. 16/732,433. The parent application listed the same inventors. It was filed on Jan. 2, 2020.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of motor vehicle control systems. More specifically, the invention comprises a module for overriding an automatic engine start-stop feature included in many modern vehicles.

2. Description of the Related Art

Increased fuel economy is a common goal in the field of motor vehicles. Government regulatory entities are mandating a steady average increase in economy for each manufacturer. A good example of this trend is the "Euro 5" standard promulgated in the European Union. The Euro 5 standard includes an enhanced driving model intended to make economy and emissions testing more closely resemble actual driving conditions. One of its components is an increased idling time—reflecting the time a vehicle sits still in traffic.

Many vehicles now incorporate automated "start-stop" functions. The goal of this feature is to switch off an internal combustion engine when it is not needed—such as when a vehicle is idling at a traffic control device. The system automatically restarts the internal combustion engine once the need for power is detected. Consider an example for a vehicle having an automatic transmission: A driver encounters a red light and brakes to a stop. After the vehicle has remained stationary for a short interval—such as five seconds—the automatic engine control unit shuts off the internal combustion engine. The engine remains off while the vehicle sits stationary and the driver keeps the brake applied.

Then the traffic light turns green. The driver lifts his or her foot off the brake pedal and begins moving it toward the accelerator. As soon as the brake pedal returns to the "off" position, the automatic start-stop system commands a restart of the internal combustion engine. For a well-designed system, the engine is ready to deliver power by the time the driver's foot reaches the accelerator.

Additional features are typically needed to ensure the smooth operation of an automated start-stop system. For example, there will be instances where the internal combustion engine is needed during periods where the vehicle is stationary and the brake is applied. The engine may be needed to: (1) Power the heating or cooling systems; (2) Provide hydraulic pressure to the power steering system; and/or (3) Provide charging current to a depleted battery. Thus, a sophisticated start-stop system may use a processor to "consider" these and other factors before triggering an automated engine stop.

Those skilled in the art will know that vehicles incorporating automated start-stop systems often include many other modifications and enhancements to make the systems operate reliably. A discussion of these additional systems is beyond the scope of this disclosure. Suffice it to say that modern manufacturers have incorporated these modifications to produce generally reliable systems. These systems do produce a measurable increase in fuel economy, with independent testing demonstrating an improvement between three and seven percent. For a vehicle spending a large amount of time in stop and go traffic, the increase can be even greater.

Nevertheless, some owners do not like the automated start-stop feature. A first reason is the fact that the long-term effects on vehicle endurance and reliability are not yet well understood. The manufacturers contend that a well-designed system will not have a negative effect, but the systems have not been around long enough to fully demonstrate this assertion. Secondly, many owners do not like the perceived lag in available power (which in some instances may be quite real). As an example, a driver may stop at an intersection and need to accelerate rapidly to merge into traffic. An automated start-stop system will often shut down the engine in this circumstance. Even if the automated system is highly reliable, it is unsettling for a driver contemplating a high speed merge to feel the engine "die." For these reasons, manufacturers often provide a manual override for the automated start-stop feature.

A good example of this manual override is found in vehicles manufactured by the Ford Motor Corporation. Ford provides a manual override button near the instrument cluster. The user simply presses this button to deactivate the automated start-stop feature. The start-stop feature will remain "off" until the user shuts down and exits the vehicle. However, the next time the user reenters the vehicle and starts it, the automated start-stop feature will revert to the "on" state. In other words, while the manual override feature is provided, the user must activate it every time the vehicle is driven.

In other instances the manufacturer simply provides no manual override function at all. The automated start-stop feature remains active in those cases and there is nothing the user can do about it. There exists a demand for a device allowing a user to selectively turn off the automated start-stop feature, and thereafter have it remain off. The present invention provides such a solution.

Those skilled in the art will understand how digital communications occur within modern motor vehicles. However, it is nevertheless helpful to provide an exemplary top-level description of these systems. Modern vehicles include many separate processors running simultaneously. These units control the engine, the transmission, the heating and cooling systems, etc. Different manufacturers arrange these control systems in different ways. However, many now use a Controller Area Network ("CAN") for communications. A CAN bus connects the components.

The general implementation of digital control uses a CAN data bus distributed throughout the vehicle. The data bus sends digital messages (such as the state of a controlling switch) that may be received by any component connected to the bus. The data bus does not provide electrical power to the actuating components such as a seat motor (though it may supply some low level power to other devices). Power is supplied separately to the actuating components through a power distribution harness.

As far as the user is concerned, the new digital paradigm often appears to function just like the old analog paradigm. As an example, if the user wishes to roll down a window, he or she still presses a designated button and the window rolls down. However, the button is not "making" an analog circuit and is not serving as part of the path for the electrical current driving the window motor. Instead, both the button and the motor are connected to a data bus, and the data bus is likely connected to a controlling microprocessor (sometimes called a "Body Control Unit" or "BCU"). The switch sends a digital message specifying its identity and the fact that the switch is in an "ON" state. The Body Control Unit receives and interprets this message, then makes an appropriate response. In response to the window control button being placed in the "ON" position, the body control unit sends a digital message to the CAN bus instructing the appropriate window motor to move the window. The window motor has an associated controller that receives and decodes this digital instruction. Power electronics within the window controller then activate a driving motor to move the window (The power electronics may be in a remotely located relay but the result is the same).

While the digital approach sounds complicated, it is in many instances much more efficient to install and run than a traditional system. Rather than routing dedicated wiring harnesses from switches to the components they control, the digital approach allows the vehicle manufacturer to provide a single data harness and only a few power harnesses. New components may also be added without the need to add additional wiring.

The first widely-used system implementing the digital paradigm was developed by Robert Bosch, GmbH in the early 1980's. Bosch called its system the "CAN bus," which is how the "CAN" name became commonly used. Bosch actually released its protocol to the Society of Automotive Engineers with the initial hope of creating a unified communication platform across all vehicle makes and models, though Bosch did not propose to offer the standard free of licensing fees.

The goal of a uniform standard has largely gone unrealized, with the various vehicle manufacturers adopting proprietary systems instead. Even so, the general characteristics of the original CAN standard are found in most vehicle operating protocols. In general, a CAN network is a "masterless" system in which various microcontrollers communicate without the need for one defined "host" computer. This is a significant feature, as a modern vehicle may contain as many as 70 separate electronic control units. The two most significant control units are typically the Engine Control Unit ("ECU") and the aforementioned Body Control Unit ("BCU"). However, as discussed in the preceding example, each individual window motor is likely to have a separate controller. Other controllers may be provided for a blower fan, an air conditioning compressor, power mirrors, air bags, air-inflated suspension "springs," an automatic transmission, and even small things like the dimming functions of a rear-view mirror.

The CAN bus itself is typically just a twisted-pair (two conductors twisted around a common axis to help cancel unwanted emissions). However, although no universal CAN standard for connectors has evolved, it is common to include the CAN pair in a four-wire cable. The four-wire cable then carries CAN−, CAN+, Power Voltage, and Ground. Using this single connector thereby allows the simultaneous connection of a component to the control bus and the power distribution bus.

The arrangement of controllers on a communication network varies widely among manufacturers. FIG. 1 shows a simplified depiction of one possible architecture. In this scheme Body Control Unit 10 ties multiple separate networks together. CAN bus 20 is used to connect the BCU to other "major" control units. These include Transmission Control Unit 12, Engine Control Unit 14, and ABS Control Unit 16. The automated start-stop feature discussed previously is generally contained within the software running on ECU 14.

In the example shown, instrument cluster 18 is controlled directly by BCU 10. Where direct control is used, a ribbon cable may provide a connection between the BCU and the instrument cluster.

BCU 10 is also connected to a second CAN bus 22. CAN bus 22 provides communication with numerous other controllers directing the actions of the climate control system, the mirrors, the power seats, etc. Significant to most embodiments of the present invention, BCU 10 controls the vehicle's lighting (including the brake lights). A brake pedal position sensor feeds a status signal to BCU 10 via CAN bus 22. In this example the status signal is created by a simple switch that "tells" the BCU the brake pedal has left its home (off) position. Such a switch is commonly used to "tell" the BCU that the brake lights need to be illuminated. It does not control the actual braking of the vehicle.

In other systems the brake pedal position switch will feed directly into the BCU (via dedicated connector pins) rather than using a CAN bus message. The present invention can operate with such a system as well.

Finally, those skilled in the art will know that some manufactures use simpler and cheaper busses to connect the BCU to things like the mirrors and the wipers. A common example is a Local Interconnect Bus ("LIN" bus). The present invention is not confined to any particular type of bus, and the mention of a type of bus is properly understood as exemplary.

BRIEF SUMMARY OF THE PRESENT INVENTION

The present invention comprises an override module allowing a vehicle operator to default the status of an automated start-stop system to "off." A first embodiment uses a module that is installed in-line with a manual override button. A second embodiment uses a module that is installed on the vehicle's CAN bus.

BRIEF DESCRIPTION OF THE SEVERAL VIEWS OF THE DRAWINGS

FIG. 4 is a schematic view, showing an embodiment of the present invention.

REFERENCE NUMERALS IN THE DRAWINGS

Figure 1:
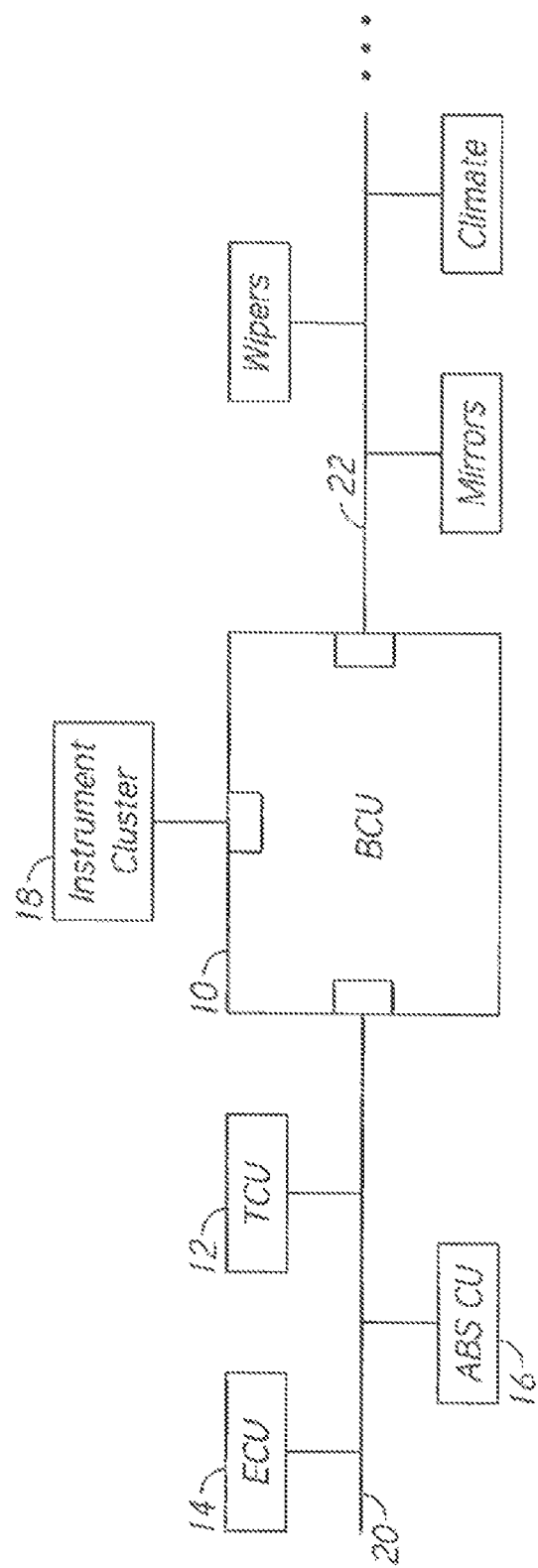
FIG. 1 is a schematic view, showing a prior art arrangement of vehicle control units.

10 Body Control Unit
12 Transmission Control Unit

14 Engine Control Unit
16 ABS Control Unit
18 instrument cluster
20 CAN bus
22 CAN bus
24 connector
26 connector
28 switch assembly
30 indicator light
32 contact switch
34 connector
36 override module
38 power supply
40 processor
42 connector
44 connector
46 override module

DETAILED DESCRIPTION OF THE INVENTION

Figure 2:
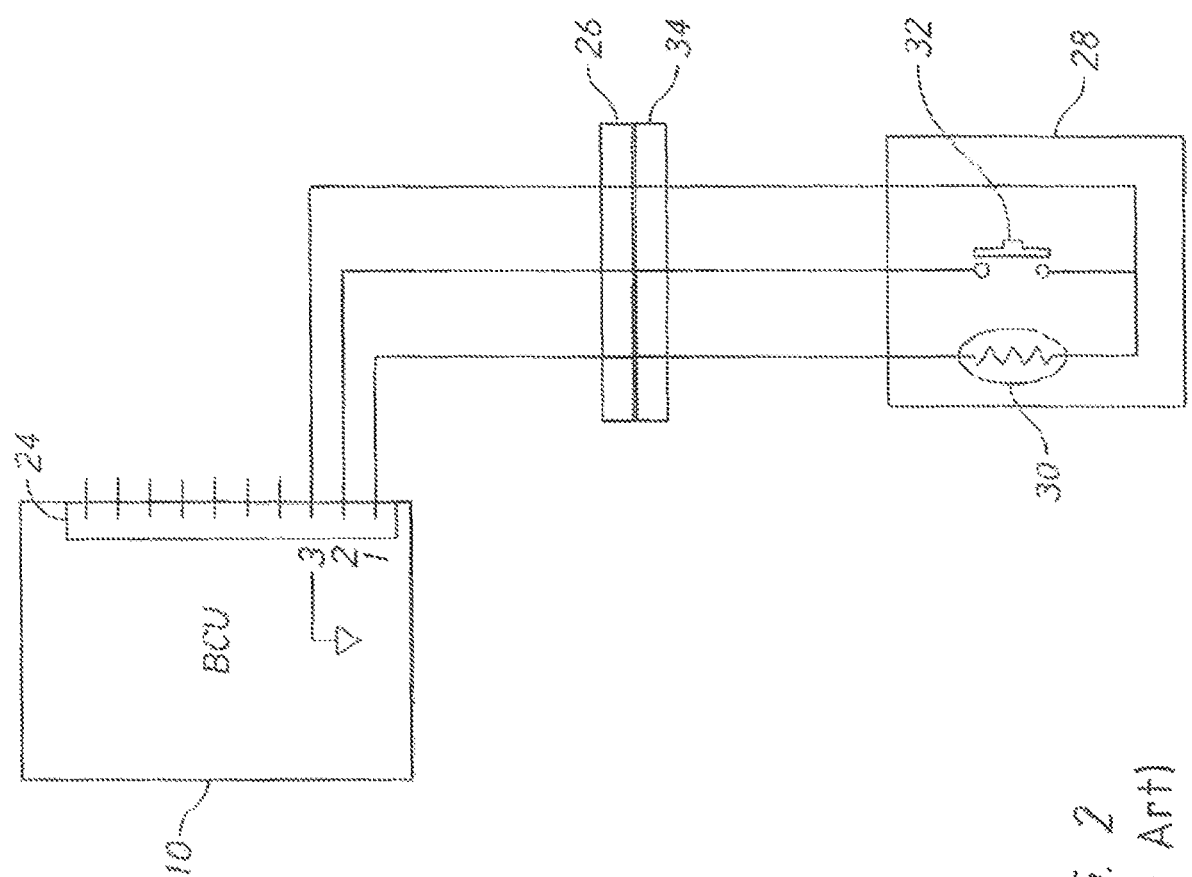
FIG. 2 is a schematic view, showing a prior art manual override button.

The first embodiment of the present invention applies to start-stop systems that include a manual override button. An example of such a system is shown in FIG. 2. Switch assembly 28 provides the manual override function. It is connected directly to Body Control Unit 10. In this instance BCU 10 has a large connector 24 with multiple pins (possibly as many as 100 pins in a single large connector). These pins directly connect the BCU to various buttons and indicators. In the example shown, Pins 1-3 connect to switch assembly 28. Connector 26 mates to connector 34 in order to provide electrical connections to switch assembly 28.

Pin 3 is ground at all times. Pin 2 is the "sense" pin for the condition of the switch. It is normally "hot," meaning it is supplied with a positive voltage from the BCU (depending on the manufacturer this is usually +5V, +7V, or +12V). When a user pressed contact switch 32, Pin 2 is pulled to ground and the BCU senses this change in voltage on Pin 2 as an indication that the user wishes to override the automated start-stop feature. The BCU then transmits a CAN "override" message to the ECU and the ECU deactivates the automated start-stop feature. The BCU also applies voltage to Pin 1, which illuminates indicator light 30. The illumination of the indicator light tells the driver that the automated start-stop feature has been disabled. In this system the BCU and ECU default to the status of the automated start-stop feature being "on" the next time the vehicle is operated. Thus, as explained previously, the user must press the button each time.

Figure 3:
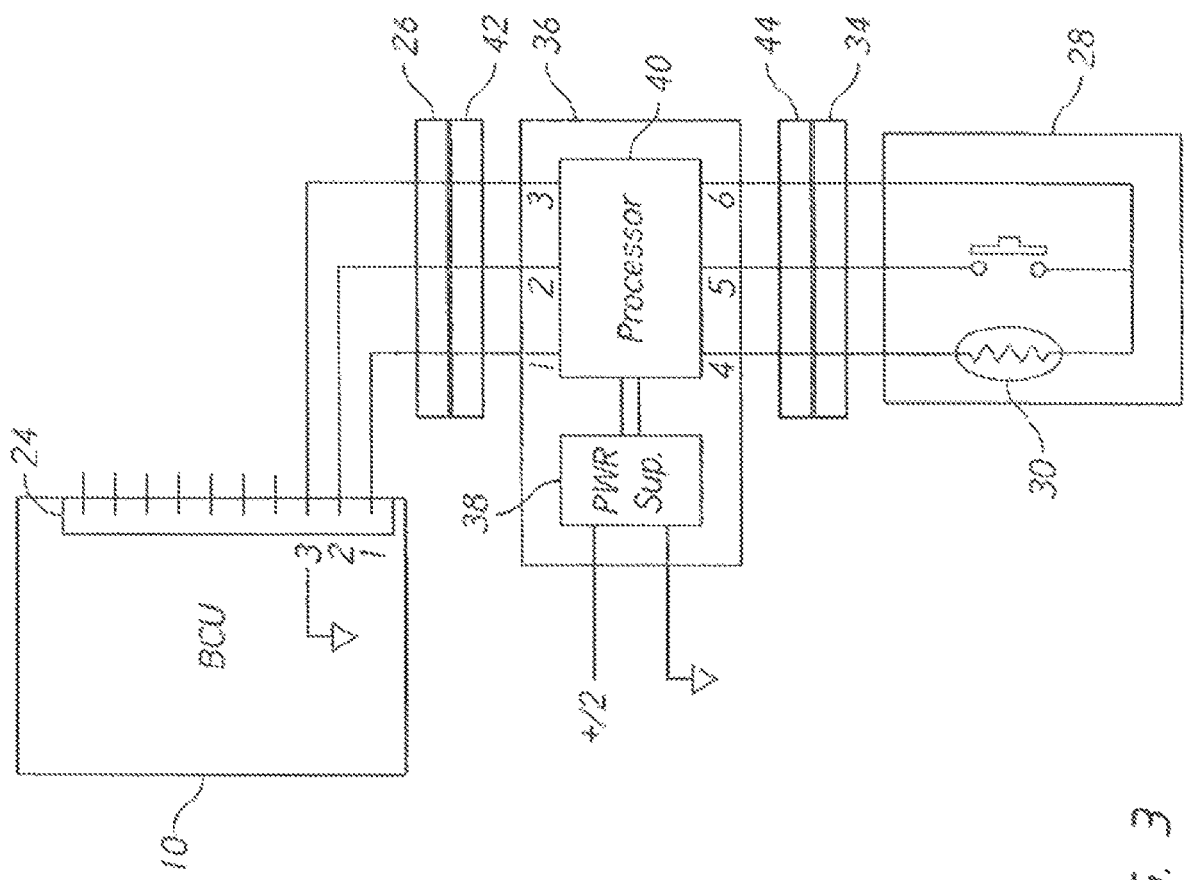
FIG. 3 is a schematic view, showing an embodiment of the present invention.

FIG. 3 shows the same arrangement with the addition of the inventive override module 36. Override module 36 is configured to be plugged "in line." Connector 42 on the override module plugs into the existing connector 26. Connector 44 on the override module plugs into the existing connector 34. Switch assembly 28 remains in place.

Override module 36 is provided with power supply 38 and processor 40. Power supply 38 in this example is connected to a switched +12V source and ground. The power supply provides power to processor 40. In the preferred mode of operation, processor 40 behaves as follows:

(1) When vehicle power is switched on, processor 40 "wakes up;"

(2) A delay is instituted in order for the other vehicle systems to become fully operational. Any suitable delay can be used. For example, 5 seconds can be used;

(3) Once the delay has run, processor 40 connects Pin 2 to Pin 3 for an interval, which should instruct the BCU to turn off the automated start-stop feature;

(4) The processor then monitors the condition of Pin 1. If voltage is sensed on Pin 1 (indicating the successful disabling of the start-stop feature), then voltage is passed through from Pin 1 to Pin 4 and Pin 3 is also connected to Pin 6 (causing indicator light 30 to illuminate); and (5) If voltage is not sensed on Pin 1, then processor 40 again connects Pin 2 to Pin 3 for an interval. The process is repeated until success is indicated by a voltage being sensed on Pin 1.

The pin nomenclature described is found on Ford vehicles. Other manufacturers will have different pin numbers. An optional embodiment of override module 36 is the "scavenging" of power from the BCU itself rather than providing an independent connection. In this version the voltage found on Pin 2 is used to power the override module directly from the BCU.

The reader will thereby understand in this embodiment of FIG. 3 that the operation of the override module is fully automated and requires no attention from the driver. Each time the vehicle is entered and started, the BCU will be "fooled" into thinking that the driver has manually depressed the manual override button.

A different embodiment is needed for vehicles that do not provide a manual override button (Note that this different embodiment can be used even where a manual override button is also present). An example of these embodiments is provided in FIG. 4. FIG. 4 represents the same communications architecture as depicted in FIG. 1, with the addition of override module 46. In this instance override module 46 is a processor that is connected to CAN bus 22. It can read messages transmitted on the CAN bus and place messages on the CAN buss as well. The implementation of this embodiment will be dependent upon the vehicle in which it is installed. This is true because the message formatting for CAN bus messages varies greatly among the different manufacturers.

Override module 46 is preferably able to automatically detect the type of vehicle it has been installed in. Auto detection methods are disclosed in detail in commonly owned U.S. Pat. Nos. 8,014,920 and 8,214,105. These prior patents are hereby incorporated by reference.

In addition to the methods disclosed in the incorporated patents, it is possible to detect the vehicle type by trial-and-error. There are a limited number of CAN bus message protocols in use and all these protocols can be stored within a processor in override module 46. The override module can then apply a succession of protocols until it starts to "see" valid CAN messages being produced. Once valid message are produced the right protocol has been identified. It is also possible to simply allow the user to set the vehicle type via a set of DIP switches, a rotary switch, or some other methodology.

Once proper CAN communication has been established between override module 46 and the host vehicle, it is necessary to determine what type of CAN message can be used to defeat the automatic start-stop function. The preferred method is a brake status message. As an example, Ford vehicles starting in 2018 use the following combination of events to activate the "stop" part of the start-stop function: (1) Foot on brake as indicated by brake status message being "on;" (2) Vehicle speed is zero; (3) Seatbelt buckled; (4) Climate control condition in a specified range; (5) Steering wheel stationary; (6) Charging system status in specified range; and (7) Defined time interval elapsed.

When these conditions are met, override module 46 will place on the CAN bus a brake status message indicating that the brake is "off." The presence of this message will cause the BCU and ECU to keep the engine running. The override module only needs to send this message periodically—sufficiently often to prevent engine stop. Once the "brake off" message is sent the normal vehicle systems will transmit a "brake on" message shortly thereafter (since the brake is in fact on).

In order to determine when a "brake off" message needs to be generated, override module 46 does not need to monitor for all the conditions that the BCU and ECU normally monitor. In this example it only needs to monitor the CAN bus messages to determine when two conditions are true. These are: (1) Vehicle speed is zero; and (2) A "brake on" message has been sent. Once the vehicle speed is back above zero the override module will go dormant until the vehicle speed again reaches zero.

Power can be provided to override module 46 by any suitable method. It is preferably provided with a switched power source so that it will not remain needlessly active. The "brake off" message is a good way to defeat the start-stop function, but there are other ways as well. As examples, the override module could be programmed to:

1. Send slightly varying steering angle messages so that the BCU/ECU keeps the engine running in order to power the hydraulic pump for the power steering;

2. Send a short interval of low vehicle speed messages so that the BCU/ECU "thinks" the vehicle is creeping forward;

3. Send a short interval of low battery messages; and

4. Send a short interval of messages indicating that the climate control system is out of range.

The selection of the messages used should be made to avoid interference with the vehicle's normal operations. For this reason, the brake status message is particularly desirable. A momentary "off" status for this message type just suggests that the driver has briefly lifted his or her foot from the brake pedal. This action is unlikely to interfere with other functions.

The reader should note that in some embodiment the brake pedal switch is directly wired to the BCU (rather than communicating via a data bus). For those instances it is desirable to provide a module such as shown in FIG. 2 that would directly alter the perceived state of the brake pedal switch. This implementation is within the scope of the invention as well.

Although the preceding descriptions contain significant detail, they should not be construed as limiting the scope of the invention but rather as providing illustrations of the preferred embodiments of the invention. Those skilled in the art will know that many other variations are possible without departing from the scope of the invention. Accordingly, the scope of the invention should properly be determined with respect to the claims that are ultimately drafted rather than the examples given.

Having described our invention, we claim:

1. A method for automatically overriding an automated engine start-stop feature in a vehicle having an automated engine start-stop feature and a manual override system, said manual override system including a control unit having a sense pin, a ground pin, a switch having a first side and a second side, a first conductor connecting said sense pin to said first side of said switch, and a second conductor connecting said second side of said switch to said ground pin, said switch being configured to pull said sense pin to ground when said switch is activated, and said control unit being configured to interpret said sense pin being pulled to ground as an activation of said manual override system, whereupon said control unit overrides said automated engine start-stop feature, said method comprising:

(a) providing an override module, including a switching circuit configured to selectively connect said first conductor to said second conductor; and (b) activating said switching circuit in said override module when power to said vehicle is switched on.

2. The automatic override method as recited in claim 1, said vehicle also including an indicator light having a first side and a second side, said first side of said indicator light being connected to an indicator light pin by a third conductor, and said second side of said indicator light being connected to a ground, said method further comprising:

(a) providing a processor in said override module;

(b) said processor monitoring a voltage upon said indicator light pin; and (c) said processor repeatedly activating said switching circuit to connect said first conductor to said second conductor for an interval until a voltage is detected upon said indicator light pin.

3. The automatic override method as recited in claim 2, wherein said override module is configured to pass a voltage through to said indicator light in order to illuminate said indicator light.

4. The automatic override method as recited in claim 2, wherein:

(a) said first and second conductors are connected to said override module by a first connector; and (b) said override module is connected to said indicator light and said contact switch by a second connector.

5. The automatic override method as recited in claim 3, wherein:

(a) said first and second conductors are connected to said override module by a first connector; and (b) said override module is connected to said indicator light and said contact switch by a second connector.

6. The automatic override method as recited in claim 1, said method further comprising (a) providing a processor in said override module; and (b) said processor activating said switching circuit to connect said sense pin to said ground pin for an interval.

7. The automatic override method as recited in claim 6, said vehicle also including an indicator light having a first side and a second side, said first side of said indicator light being connected to an indicator light pin by a third conductor, and said second side of said indicator light being connected to a ground, said method further comprising:

(a) said processor monitoring a voltage upon said indicator light pin; and (b) said processor repeatedly activating said switching circuit to connect said sense pin to said ground pin until a voltage is detected upon said indicator light pin.

8. The automatic override method as recited in claim 7, wherein:

(a) said first and second conductors are connected to said override module by a first connector; and (b) said override module is connected to said indicator light and said contact switch by a second connector.

9. The automatic override method as recited in claim 4, wherein said override module is a separate device configured to be inserted between said first and second connectors.

10. The automatic override method as recited in claim 8, wherein said override module is a separate device configured to be inserted between said first and second connectors.

11. In a vehicle having an automated engine start-stop feature and a manual override system, said manual override system including a control unit, a switch having a first side and a second side, a first conductor connecting said control unit to said first side of said switch, and a second conductor connecting said second side of said switch to said control unit, said control unit being configured to interpret an activation of said switch as an activation of said manual override system, whereupon said control unit overrides said automated engine start-stop feature, a method for automatically overriding said automated engine start-stop feature, comprising:
 (a) providing an override module, including a switching circuit configured to selectively connect said first conductor to said second conductor; and
 (b) activating said switching circuit in said override module when power to said vehicle is switched on.

12. The automatic override method as recited in claim 1, said vehicle also including an indicator light having a first side and a second side, said first side of said indicator light being connected to an indicator light pin on said controller by a third conductor, and said second side of said indicator light being connected to a ground, said method further comprising:
 (a) providing a processor in said override module;
 (b) said processor monitoring a voltage upon said indicator light pin; and
 (c) said processor repeatedly activating said switching circuit to connect said first conductor to said second conductor for an interval until a voltage is detected upon said indicator light pin.

13. The automatic override method as recited in claim 12, wherein said override module is configured to pass a voltage through to said indicator light in order to illuminate said indicator light.

14. The automatic override method as recited in claim 12, wherein:
 (a) said first and second conductors are connected to said override module by a first connector; and
 (b) said override module is connected to said indicator light and said contact switch by a second connector.

15. The automatic override method as recited in claim 13, wherein:
 (a) said first and second conductors are connected to said override module by a first connector; and
 (b) said override module is connected to said indicator light and said contact switch by a second connector.

16. The automatic override method as recited in claim 11, said method further comprising
 (a) providing a processor in said override module; and
 (b) said processor activating said switching circuit to connect said first conductor to said second conductor for an interval.

17. The automatic override method as recited in claim 16, said vehicle also including an indicator light having a first side and a second side, said first side of said indicator light being connected to said control unit by a third conductor, and said second side of said indicator light being connected to a ground, said method further comprising:
 (a) said processor monitoring a voltage upon said third conductor; and
 (b) said processor repeatedly activating said switching circuit to connect said first and second conductors until a voltage is detected upon said third conductor.

18. The automatic override method as recited in claim 17, wherein:
 (a) said first and second conductors are connected to said override module by a first connector; and
 (b) said override module is connected to said indicator light and said contact switch by a second connector.

19. The automatic override method as recited in claim 14, wherein said override module is a separate device configured to be inserted between said first and second connectors.

20. The automatic override method as recited in claim 18, wherein said override module is a separate device configured to be inserted between said first and second connectors.

* * * * *